(12) United States Patent
Fahl et al.

(10) Patent No.: US 6,679,291 B1
(45) Date of Patent: Jan. 20, 2004

(54) POPPET VALVE ASSEMBLY

(75) Inventors: Richard L. Fahl, Fairfield, OH (US); John T. Hill, Winnpeg (CA)

(73) Assignee: Exxon.Valve and Coupling Company, Chestertown, MD (US)

( * ) Notice: Subject to any disclaimer, the term of this patent is extended or adjusted under 35 U.S.C. 154(b) by 0 days.

(21) Appl. No.: 10/285,197

(22) Filed: Oct. 31, 2002

(51) Int. Cl.⁷ .............................. F16K 37/00; B65B 1/30
(52) U.S. Cl. .................. 137/559; 137/614.06; 137/351; 137/234.6; 73/861.56; 141/94
(58) Field of Search ................. 137/614.04, 614.06, 137/559, 351, 234.6; 73/861.55, 861.58, 861.56; 141/94

(56) References Cited

U.S. PATENT DOCUMENTS

| | | | | |
|---|---|---|---|---|
| 1,730,118 A | * | 10/1929 | Cobb | 73/861.55 |
| 2,231,907 A | * | 2/1941 | Harris | 73/861.55 |
| 2,778,223 A | * | 1/1957 | Kimbrell | 73/861.55 |
| 2,847,969 A | * | 8/1958 | Woodruff | 73/861.55 |
| 3,315,523 A | * | 4/1967 | Conkling | 73/861.56 |
| 3,633,421 A | * | 1/1972 | Phillips | 73/861.55 |
| 3,881,510 A | * | 5/1975 | Hansel | 137/590 |
| 4,317,376 A | * | 3/1982 | Fitzpatrick | 73/861.55 |
| 4,628,960 A | * | 12/1986 | Brickell et al. | 137/558 |
| 4,693,268 A | | 9/1987 | Fahl | 137/614.06 |
| 4,813,449 A | | 3/1989 | Fahl | 137/614.06 |
| 5,127,428 A | | 7/1992 | Fahl | 137/614.06 |
| 5,211,698 A | * | 5/1993 | Winfrey | 303/86 |
| 5,244,017 A | * | 9/1993 | Hartman et al. | 141/5 |
| 5,564,858 A | | 10/1996 | Bravo | 137/312 |

OTHER PUBLICATIONS

EBW Inc., *Tank Truck Equipment*, 1999, Muskegon, Michigan.
EMCO Wheaton, *Loading & Unloading the World*, Apr. 2001, Louisville, Kentucky.
Civacon, *Civacon Transport Equipment Catalog*, 2001, Riverside, Missouri.

* cited by examiner

Primary Examiner—A. Michael Chambers
(74) Attorney, Agent, or Firm—Wood, Herron & Evans, L.L.P.

(57) ABSTRACT

A poppet valve assembly is provided for use on a fuel tanker truck which enables the truck's driver to determine whether fuel is flowing through the valve assembly and whether fuel is present in the valve assembly. When a threshold flow rate through the valve assembly is reached, fluid flows inside a flow channel. The flow channel has a fluid indicator and a flow indicator therein mounted in a sight glass. When fluid is flowing in the flow channel both indicators rise. When fluid is present but not flowing in the flow channel only the fluid indicator rises. The fluid and flow indicators, being different colors, may be easily seen at a distance.

20 Claims, 4 Drawing Sheets

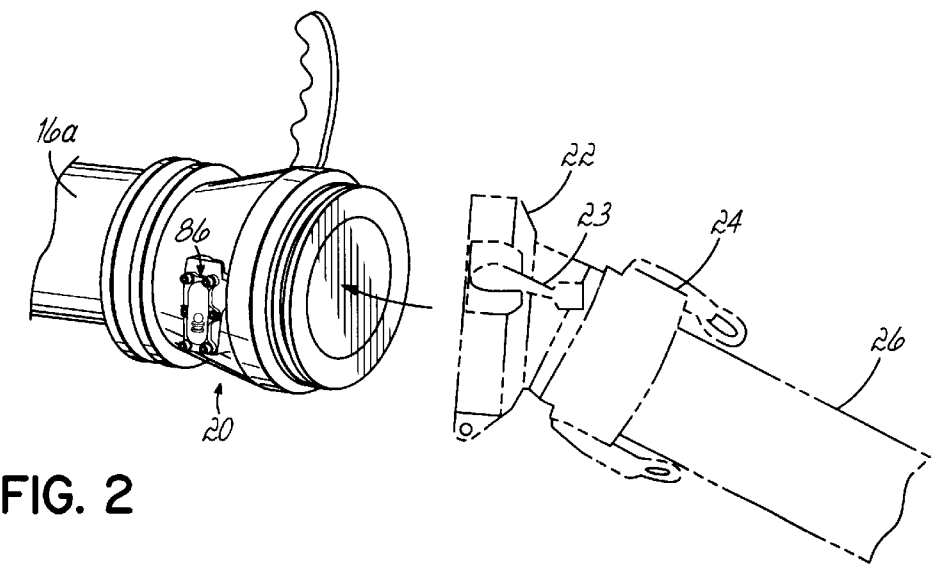
FIG. 2
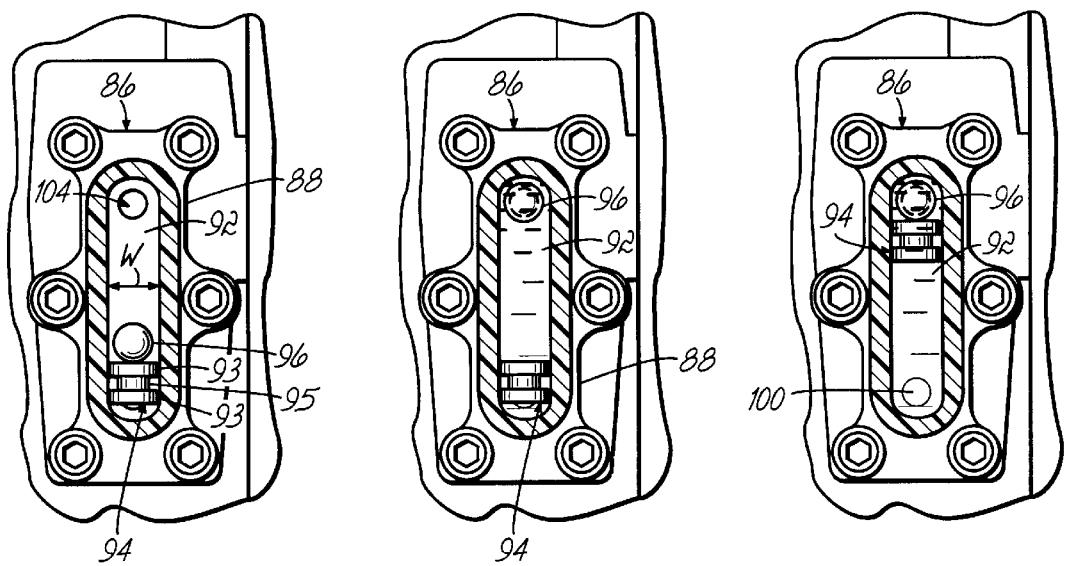
FIG. 4A  FIG. 4B  FIG. 4C

POPPET VALVE ASSEMBLY

FIELD OF THE INVENTION

This invention relates generally to poppet valve assemblies for controlling flow therethrough of a fluid, such as gasoline from a gasoline tank truck into an underground storage tank at a filing station.

BACKGROUND OF THE INVENTION

In order to fill one or more underground storage tanks at a gasoline service station, a cargo tank truck typically pulls into the service station and unloads the fuel from the truck into the underground storage tank or tanks. Such a cargo tank truck commonly has multiple fuel storage compartments, each compartment having a cover and a pipe located below the tank to which is connected a valve assembly. The valve assembly is commonly a poppet valve assembly which is opened and closed by the truck's driver via a handle extending upwardly from the valve assembly. In order to unload fuel from one of the truck's fuel storage compartments into the underground storage tank, the truck driver or operator connects two hoses from the truck to elbows on the underground storage tank. One of the hoses is a vapor recovery hose which returns vapors to the truck from the underground storage tank. The other hose is connected at one end to one of the valve assemblies on the truck via an adaptor and at the other end to the underground storage tank. In order to cause fuel to flow through this hose to the underground storage tank, the truck driver simply opens the valve assembly.

Commonly, each underground storage tank has a valve therein, which closes when the underground storage tank is sufficiently full, thereby stopping the flow of fuel from the truck to the underground storage tank. After this valve in the underground storage tank closes, gasoline or fuel is still present in the line or hose extending between the cargo tank truck compartment and the underground storage tank. In order to prevent gasoline from overflowing onto the pavement of the service station, the operator of the cargo tank truck closes the valve assembly on the cargo truck and opens one of the cam arms on the adaptor, thereby allowing air to enter the hose. The air in the hose forces the fuel in the hose towards the underground storage tank and through a bleeder hole in the valve in the underground storage tank. After a sufficient time period has passed, the operator simply disconnects the adaptor from the valve assembly, removes the hose from the elbow of the underground storage tank and places the hose on the truck. After the vapor recovery hose is disconnected and placed on the truck the driver may move to the next location.

In order to prevent an accidental overflow, it is desirable for the cargo tank truck operator or driver to know if liquid is present in the valve assembly, and if liquid is flowing through the valve assembly. The operator does not want to disconnect the adaptor from the valve assembly of the truck with liquid present in the valve assembly or flowing therethrough. Consequently, it is advantageous for the driver to know whether fluid is present in the valve assembly and whether the flow of fuel through the hose has stopped.

Valve assemblies are known which have a sight glass built therein in which a float is located in order to indicate liquid presence in the valve assembly. The float commonly comprises a hollow ball. When liquid is present in the sight glass, the float raises because its density is less than the density of gasoline. Thus, the operator is able to tell whether fuel is present in the valve assembly.

In addition, one valve assembly manufacturer has incorporated a flow indicator into its valve assembly. This flow indicator contains three flourescent orange balls in a sight glass which rise when fluid is present in the sight glass and hence in the valve. In addition, the orange balls rotate when fluid is flowing through the valve and through the sight glass. In order to determine if fluid is flowing through this valve assembly, one must determine whether the balls are rotating. Often this is difficult to do given the small size of the balls so that, in order to make a determination, one must be very close to the valve assembly. The truck's driver is not able to determine whether the orange balls are rotating from a distance.

Therefore, it has been one objective of the present invention to provide a poppet valve assembly having a flow indicator which may be read from a distance quickly and easily.

It is a further objective of the present invention to provide a poppet valve assembly having a fluid indicator and a flow indicator which may be read from a distance quickly and easily.

SUMMARY OF THE INVENTION

The invention of this application which accomplishes these and other objectives comprises a poppet valve assembly for use on a fuel tanker truck for unloading fuel from the truck into an underground storage tank at a service station.

The poppet valve assembly of the present invention comprises a housing having a flow passage therethrough. The flow passage has a central axis.

The poppet valve assembly further comprises a poppet structure for controlling fluid flow through the flow passage The poppet structure is operatively coupled to a handle so that when an operator pulls on the handle, the poppet structure moves axially, thereby opening the valve and enabling fuel to flow through the flow passage.

A sight glass assembly is mounted to the housing on the exterior of the housing. The sight glass assembly comprises a sight glass having an interior in which is located a flow indicator and a fluid indicator. The sight glass is preferably made of plastic but may be made of any see through material such as glass. The flow indicator is a dumpbell shaped object preferably made of nylon which moves in the interior of the sight glass. However, the flow indicator may be made of any other suitable material. A fluid indicator in the form of a hollow ball made of polyethylene moves in the interior of the sight glass above the flow indicator. However, the fluid indicator may be made of any other suitable material.

The shape/configuration of the interior of the sight glass is such that the fluid indicator is always located above the flow indicator. The fluid indicator has a density less than the density of fuel, so that it floats when fuel fills the interior of the sight glass. The flow indicator is denser than the density of fuel, so that it will only raise when a threshold flow rate occurs through the interior of the sight glass. The fluid indicator is preferably a green spherical-shaped ball, but may be made of other colors or other shapes. Similarly, the flow indicator is preferably a dumbbell-shaped red object. The contrast between the red and green colors enables a truck operator to determine the presence of fluid in the sight glass and whether fuel is flowing through the sight glass easily and at a distance.

When the flow rate through the flow passage of the housing reaches a threshold value, typically 30 gallons per minute, fluid flows through a flow channel which includes the interior of the sight glass. The flow channel is in fluid communication with the flow passage of the valve assembly. The flow channel has an inlet extending between the flow passage and a lower portion of the interior of the sight glass. The flow channel also has an outlet extending between the flow passage and an upper portion of the interior of the sight glass, so that fluid flows upwardly through the interior of the sight glass when the threshold flow rate in the flow passage is reached. A portion of the outlet extends generally parallel to the central axis of the flow passage and the inlet of the flow channel extends generally perpendicular to the central axis of the flow passage, thereby creating a pressure differential so that fluid flows through the flow channel due to a Venturi effect.

These and other objects and advantages of the present invention will be more readily apparent from the following drawings.

BRIEF DESCRIPTION OF THE DRAWINGS

FIG. 2 is a perspective view of the poppet valve assembly of the present invention mounted on a pipe of a fuel tanker truck to which an adapter and hose are being connected;

FIG. 4A is a side elevational view, partially broken away, of the sight glass assembly showing no fluid inside of the interior of the sight glass;

FIG. 4B is a side elevational view like FIG. 4A, but illustrating fluid present in the interior of the sight glass, but not flowing therethrough;

FIG. 4C is a side elevational view like FIGS. 4A and 4B, but illustrating fluid flowing through the interior of the sight glass;

DETAILED DESCRIPTION OF THE INVENTION

Figure 1:
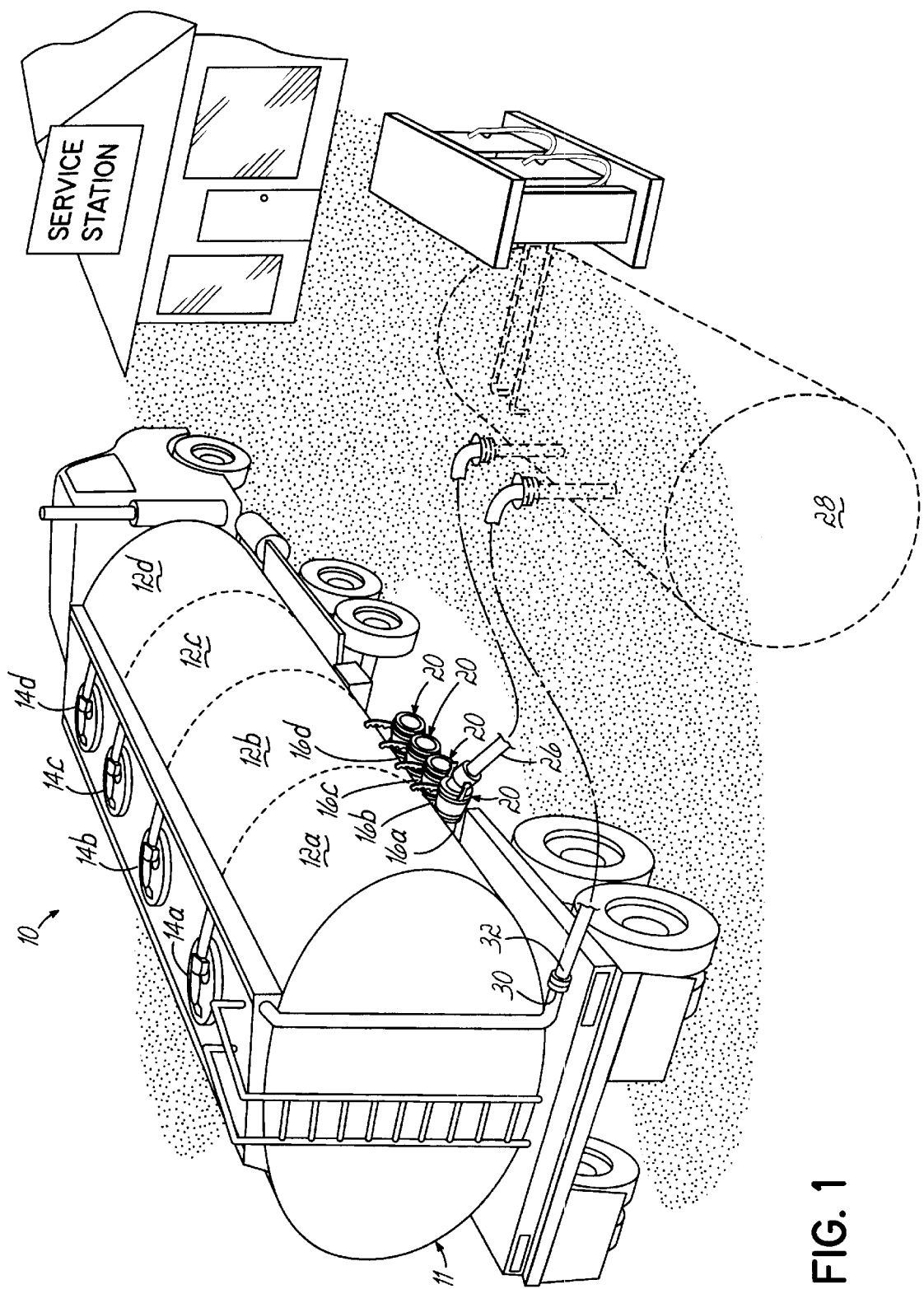
FIG. 1 is a perspective view of a fuel tanker truck unloading fuel into a underground storage tank at a service station.

Referring to the figures and particularly FIG. 1 there is illustrated a fuel tanker truck 10 having a tank 11 with four compartments 12a, 12b, 12c, and 12d having respective covers 14a, 14b, 14c, and 14d. Although the compartments are illustrated by dashed lines, these dashed lines are for illustration purposes only. The truck may have any number of compartments in any location. Below the tank 11 are a plurality of pipes 16a, 16b, 16c, and 16d in fluid communication with the compartments 12a, 12b, 12c, and 12d, respectively. Each of the pipes 16a, 16b, 16c, and 16d have a poppet valve assembly 20 located at the end thereof.

As illustrated in FIG. 2, pipe 16a has a poppet valve assembly 20 secured to the end thereof in a manner known in the art. The poppet valve assembly 20 is the subject of the present invention and will be described in more detail below.

As shown in FIGS. 1 and 2, an adaptor 22 is operatively coupled to a coupler 24 secured to the end of the hose 26 which extends to an underground storage tank 28. The adaptor 22 has a pair of cam arms 23 (only one being shown) which secure the adaptor 22 to the poppet valve assembly 20. A vapor recovery fitting 30 forms part of the truck 10 and is connected to a vapor recovery hose 32 which extends between the vapor recovery fitting 30 and the underground storage tank 28, as is conventional in the art. The adaptor 22, coupler 24, hoses 26, 32, vapor recovery fitting 30 and storage tank 28 are all conventional in the art and are not considered a part of the present invention.

Figure 3:
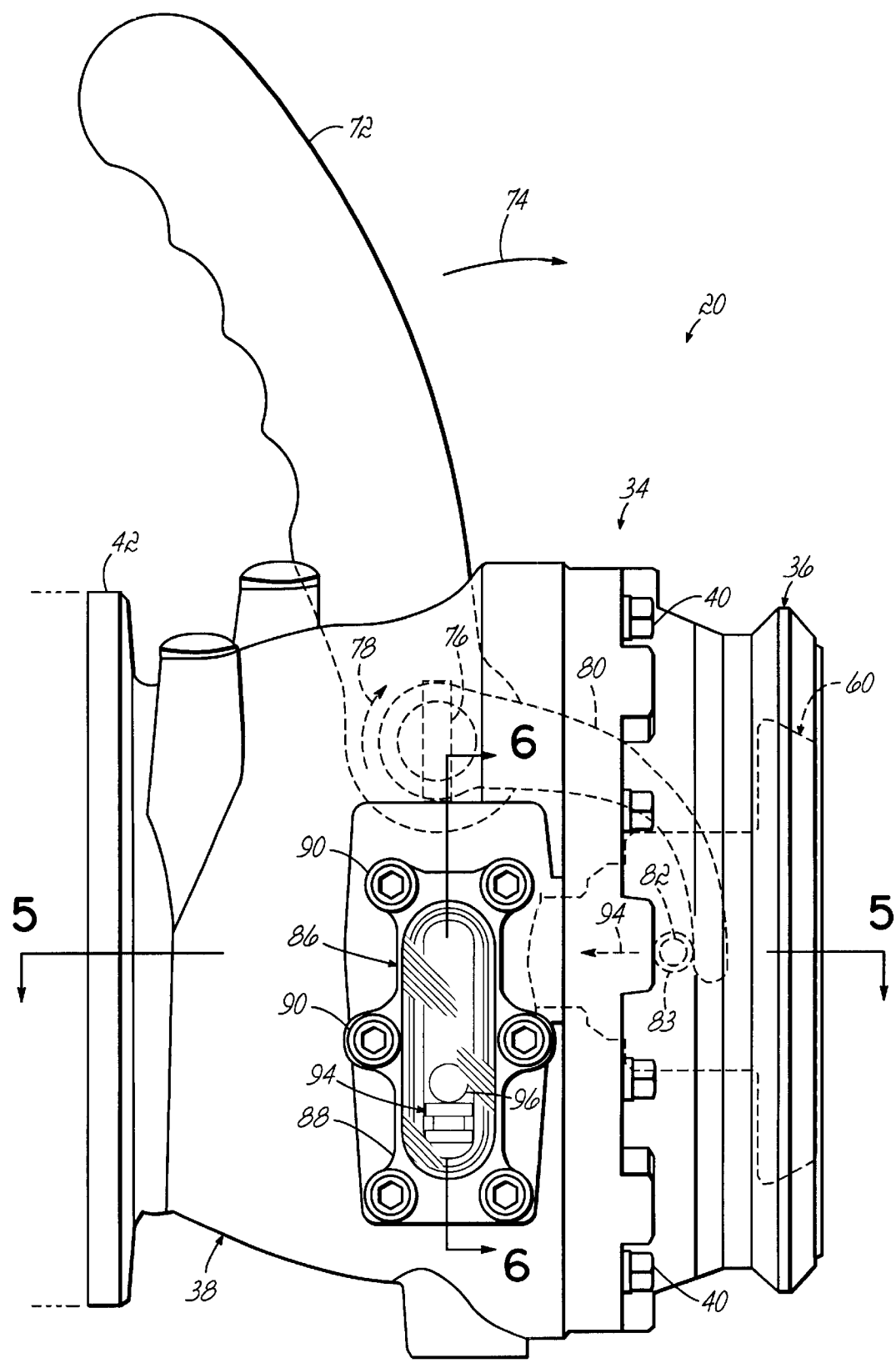
FIG. 3 is a side elevational view of the poppet valve assembly of the present invention.
Figure 5:
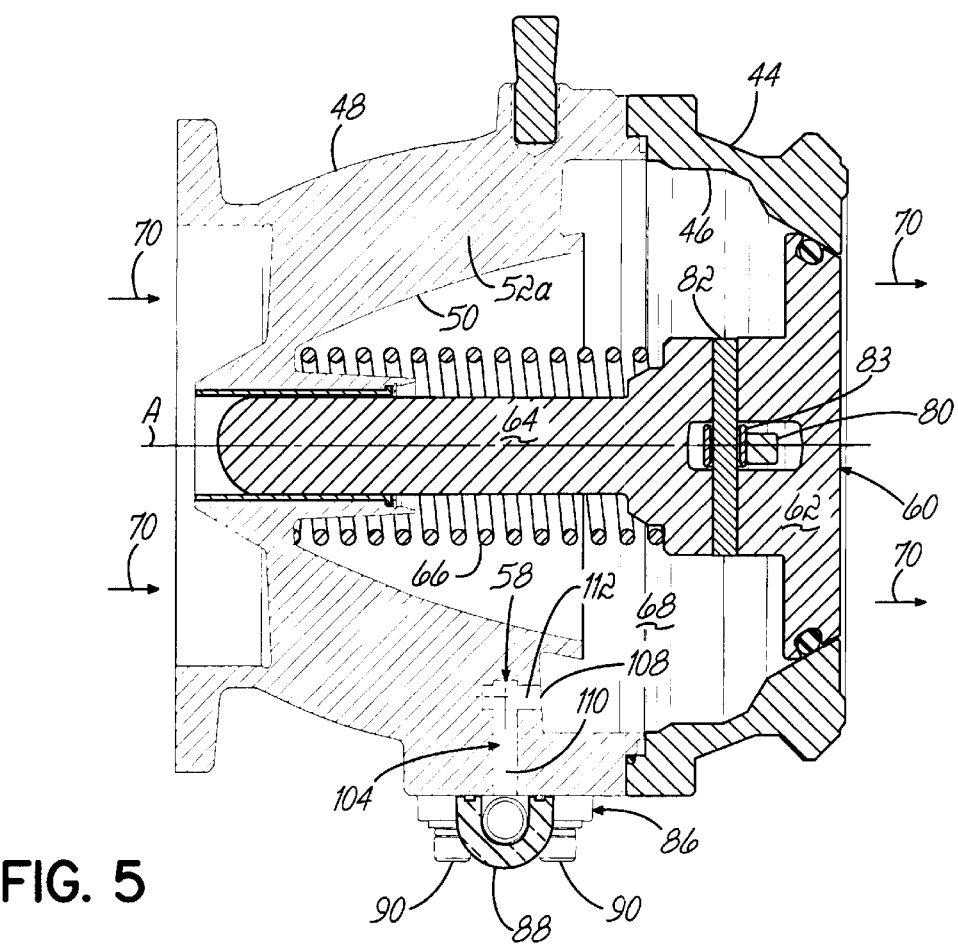
FIG. 5 is a view taken along the line of 5—5 of FIG. 3.
Figure 6:
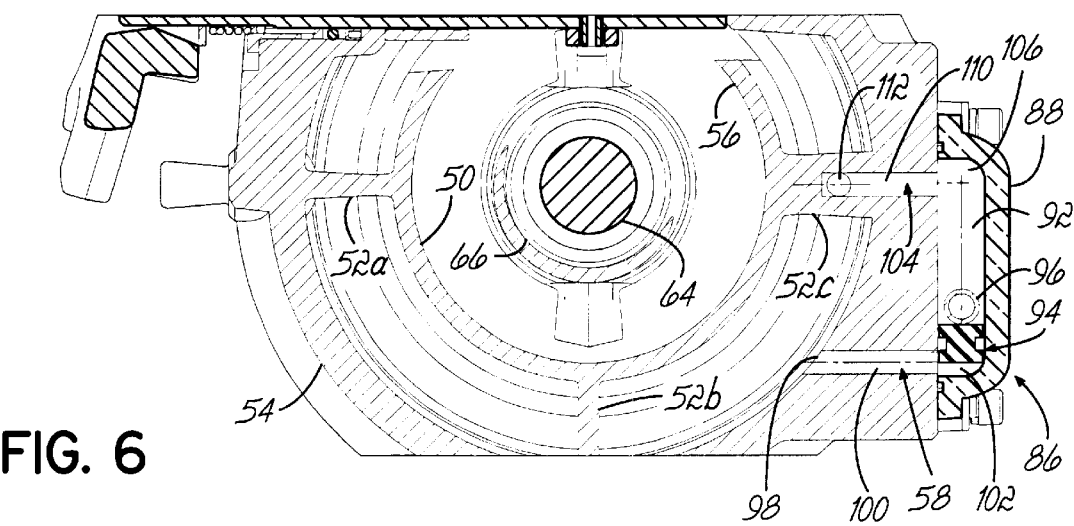
FIG. 6 is a view taken along the line of 6—6 of FIG. 3.

The poppet valve assembly 20 of the present invention is illustrated in detail in FIGS. 3, 4A, 4B, 4C, 5, and 6. Referring to FIG. 3, the poppet valve assembly 20 comprises a two-part housing 34, having a front piece 36 joined to a rear piece 38 with a plurality of fasteners 40. The fasteners 40 are illustrated as being bolts, but may be any other type of fastener. The rear piece 38 of the housing has a flange 42 with a plurality of openings therein (not shown) to secure the valve assembly to one of the pipes 12a, 12b, 12c, and 12d of the truck 10 with fasteners (not shown). As best illustrated in FIGS. 5 and 6, the front piece 36 of the housing 34 has an outer surface 44 and an inner surface 46. Similarly, the rear piece 38 of the housing 34 has an outer surface 48 and an inner surface 50. A plurality of spaced ribs 52a, 52b, and 52c extend between an outer portion 54 of the rear piece 38 of the housing 34 and an inner annular portion 56 of the rear piece 38 of the housing 34. A fourth rib is not shown. The rib 52c is thicker than the ribs 52a and 52b because a portion of a flow channel 58 passes therethrough. The flow channel 58 and its operation will be described in more detail below.

As best illustrated in FIGS. 5 and 6, a poppet structure 60 having a generally circular front portion 62 and a rear portion 64 is biased forwardly by a spring 66 as is conventional in poppet valve assemblies. Between the poppet structure 60 and the housing 34 is a flow passage 68 having a central axis A. When the poppet valve assembly 20 of the present invention is opened, fuel flows through the flow passage 68 in the direction of arrows 70 from the rear to the front of the valve assembly.

As shown in FIG. 3, in order to move the poppet structure 60 in a rearward direction against the bias of the spring 66, a handle 72 is pulled forwardly by the operator of the truck in the direction of arrow 74. The handle 72 is operatively coupled to a shaft 76 which is rotated in the direction of arrow 78 (clockwise as shown in FIG. 3). Rotation of the shaft 76 causes a cam 80 to pull a pin 82 connected to the poppet structure 60 rearwardly, i.e. in the direction of arrow 94. A sleeve bearing 83 surrounds the pin 82 After the poppet structure 60 is moved rearwardly a sufficient distance, fluid may flow through the flow passage inside the housing 34, out of the valve assembly 20 into the hose 26 and ultimately into the underground storage tank 28.

As best illustrated in FIG. 3, a sight glass assembly 86 is mounted to the exterior of the rear piece 38 of the housing 34 on the side thereof. The sight glass assembly 86 includes a sight glass 88 mounted to the housing with fasteners 90. However, any other method of mounting the sight glass to the exterior of the housing may be used in accordance with the present invention. The sight glass 88 is preferably made of transparent plastic which one may see through, although it may be made of any transparent material.

The sight glass 88 has an interior 92, best illustrated in FIGS. 4A, 4B, and 4C, of a width W. Inside the interior 92 of the sight glass 88 is a flow indicator 94 and a fluid indicator 96. Due to the limited width W of the interior 92 of the sight glass 88, the fluid indicator 96 is always located above the flow indicator 94. The fluid indicator 96 is preferably a hollow ball formed of polyethylene and the flow indicator 94 is a dumpbell-shaped object formed of nylon, having a pair of cylindrical ends 93 connected by a shaft 95. However, the indicators 94, 96 may be made of any other materials and be other shapes in accordance with the present invention. In addition, the fluid indicator 96 is preferably colored green and the flow indicator colored red for increased visibility. However, the fluid indicator 96 and flow indicator 94 may be any other colors in accordance with the present invention.

Referring to FIGS. 5 and 6, the flow channel 58 extends from the flow passage 68, through the interior 92 of the sight glass 88, and then back to the flow passage 68. The flow channel 58 has an entry 98 formed in the rear piece 38 of the housing 34 and an inlet 100 which extends in a direction generally perpendicular to the direction of the axis A of the flow passage 68. As best illustrated in FIG. 6, the inlet 100 has a circular cross-section and extends between the entry 98 in the flow passage 68 and a lower portion 102 of the interior 92 of the sight glass 88. The flow channel 58 further comprises an outlet 104 extending between an upper portion 106 of the interior 92 of the sight glass 88 back to the flow passage 68 at exit 108. The outlet 104 has a circular cross-sectional configuration, a first portion 110 which extends generally perpendicular to the direction of the axis A of the flow passage 68 and a second portion 112 extending parallel to the axis A of the flow passage 68 and terminating at exit 108. Thus, the first and second portions 110, 112 of the outlet 104 are generally perpendicular to each other, as best illustrated in FIG. 5. This particular configuration of flow channel 58 creates a Venturi effect due to a pressure differential between the entry 98 of the inlet 100 and the exit 108 of the outlet 104 of the flow channel 58. Due to this pressure differential—the pressure being greater at the entry 98 than at the exit 108—fuel flows through the flow channel 58 when the flow rate through the flow passage 68 of the valve assembly 20 reaches a threshold flow rate. This threshold value has been found to be thirty (30) gallons per minute of fuel, but may be more or less in accordance with the present invention. In order to achieve flow through the flow channel 58, the inlets and outlets must be approximately one quarter inch in diameter.

Turning now to FIGS. 4A, 4B, and 4C, the operation of the fluid and flow indicators 96, 94 located in the flow channel 58 will now be described. As illustrated FIG. 4A, when no fluid is present in the flow channel, both the flow and fluid indicators 94, 96 are located in the lower portion 102 of the interior 92 of the sight glass 88. As illustrated in FIG. 4B, when fluid is present in the flow channel 58, including the interior 92 of the sight glass 88 but not flowing through the flow channel 58, the flow indicator 94 is located in the lower portion 102 of the interior 92 of the sight glass 88 and the fluid indicator 96 is located in the upper portion 106 of the interior 92 of the sight glass 98, due to the fact that the fluid indicator 94 is floating in the fuel but the flow indicator 96 is not. The reason for this is that density of the fluid indicator 96 is less than the density of gasoline and the density of the flow indicator 94 is greater than the density of gasoline. As illustrated in FIG. 4C, when fluid is flowing through the interior 92 of the sight glass 88, both the fluid and flow indicators 96, 94 are raised to the upper portion 106 of the interior 92 of the sight glass 88.

Due to the different colors of the fluid and flow indicators an operator can see from a distance 1) whether fluid is present in the interior 92 of the sight glass 88 and 2) whether or not fluid is flowing through the interior 92 of the sight glass 88 quickly and easily. The operator does not have to get up close to the sight glass in order to determine whether balls are rotating as in heretofore known poppet valve assemblies having flow determination characteristics.

Although we have described one preferred embodiment of our invention, we do not intend to be limited except by the scope of the following claims.

We claim:

1. A poppet valve assembly for use on a fuel tanker truck for unloading fuel from said truck, said poppet valve assembly comprising:
   a housing;
   a flow passage in said housing,
   a poppet structure for controlling fluid flow through said flow passage,
   means for opening and closing said poppet structure,
   a sight glass assembly mounted to said housing on the exterior of said housing, said sight glass assembly including;
   a sight glass having an interior,
   a flow indicator adapted to move in said interior of said sight glass, said flow indicator having a density greater than the density of said fuel,
   a flow channel in fluid communication with said flow passage, said flow channel extending through said interior of said sight glass,
   wherein said flow indicator raises in said sight glass when fuel is flowing through said flow channel.

2. The poppet valve assembly of claim 1 further comprising a fluid indicator adapted to move in said interior of said sight glass above said flow indicator.

3. The poppet valve assembly of claim 2 wherein said flow indicator is a different color than said fluid indicator.

4. The poppet valve assembly of claim 2 wherein said fluid indicator has a density less than the density of said fuel.

5. The poppet valve assembly of claim 2 wherein said fluid indicator is always above said flow indicator.

6. The poppet valve assembly of claim 1 wherein a portion of said flow channel extends generally parallel a central axis of said flow passage and a portion of said flow channel extends generally perpendicular to said central axis of said flow passage thereby creating a pressure differential so that fuel flows through said flow channel.

7. The poppet valve assembly of claim 1 wherein said flow indicator has a dumbbell shape.

8. The poppet valve assembly of claim 1 wherein fuel flows through said flow channel when the flow rate through said flow passage is above 30 gallons per minute.

9. A poppet valve assembly for use on a fuel tanker truck for unloading fuel from said truck, said poppet valve assembly comprising:
   a housing;
   a flow passage in said housing,
   a poppet structure for controlling fluid flow through said flow passage,
   means for opening and closing said poppet structure,
   a sight glass assembly mounted to said housing on the exterior of said housing, said sight glass assembly including;
   a sight glass having an interior,
   a flow indicator adapted to move in said interior of said sight glass,
   a fluid indicator adapted to move in said interior of said sight glass such that said fluid indicator is always above said flow indicator,
   a flow channel in fluid communication with said flow passage, said flow channel extending through said interior of said sight glass,
   wherein said fluid indicator is raised in said interior of said sight glass when fuel is present in said flow channel and said flow indicator raises in said sight glass when fuel is flowing through said flow channel.

10. The poppet valve assembly of claim 9 wherein said flow indicator is a different color than said fluid indicator.

11. The poppet valve assembly of claim 9 wherein said flow indicator has a density greater than the density of said fuel.

12. The poppet valve assembly of claim 9 wherein said fluid indicator has a density less than the density of said fuel.

13. A poppet valve assembly for use on a fuel tanker truck for unloading fuel from said truck, said assembly comprising:
- a housing;
- a flow passage in said housing, said passage having a central axis,
- a poppet structure for controlling fluid flow through said passage,
- a handle operatively coupled to said poppet structure for opening and closing said poppet structure,
- a sight glass assembly mounted to said housing on the exterior of said housing, said sight glass assembly comprising;
- a sight glass having an interior located between said housing and said sight glass,
- a flow indicator adapted to move in said interior of said sight glass,
- a fluid indicator adapted to move in said interior of said sight glass above said flow indicator,
- a flow channel having an inlet extending between said flow passage and a lower portion of said interior of said sight glass and an outlet extending between said flow passage and an upper portion of said interior of said sight glass, wherein fuel flows through said flow channel when a threshold flow rate through said flow passage is reached, and
- wherein said fluid indicator is raised in said interior of said sight glass when fuel is present in said channel and said flow indicator raises in said sight glass when fuel is flowing through said channel.

14. The poppet valve assembly of claim 13 wherein said flow indicator is a different color than said fluid indicator.

15. The poppet valve assembly of claim 13 wherein said flow indicator has a density greater than the density of said fuel.

16. The poppet valve assembly of claim 13 wherein said fluid indicator has a density less than the density of said fuel.

17. The poppet valve assembly of claim 13 wherein said interior of said sight glass is such that said fluid indicator is always above said flow indicator.

18. The poppet valve assembly of claim 13 wherein a portion of said outlet extends generally parallel said central axis of said flow passage and said inlet extends generally perpendicular to said central axis of said flow passage thereby creating a pressure differential so that fuel flows through said flow channel.

19. The poppet valve assembly of claim 13 wherein said flow indicator has a dumbbell shape.

20. The poppet valve assembly of claim 13 wherein said threshold flow rate is 30 gallons per minute.

* * * * *

UNITED STATES PATENT AND TRADEMARK OFFICE
CERTIFICATE OF CORRECTION

PATENT NO. : 6,679,291 B1  Page 1 of 1
DATED : January 20, 2004
INVENTOR(S) : Richard L. Fahl and John T. Hill It is certified that error appears in the above-identified patent and that said Letters Patent is hereby corrected as shown below:

Title page,
Item [73], after Assignee, delete "Exxon.Valve and Coupling Company" to -- Dixon Valve and Coupling Company --.

Column 2,
Line 33, change "flow passage The" to -- flow passage. The --.

Column 4,
Line 13, change "assembly to" to -- assembly 20 to --.
Line 43, change "82 After" to -- 82. After --.
Line 45, change "passage inside" to -- passage 68 inside --.

Column 5,
Line 35, change "one quarter" to -- one-quarter --.
Line 39, change "illustrated FIG." to -- illustrated in FIG --.

Signed and Sealed this

Thirteenth Day of April, 2004

JON W. DUDAS
*Acting Director of the United States Patent and Trademark Office*